United States Patent [19]

Hagiwara et al.

[11] 4,062,998

[45] Dec. 13, 1977

[54] HEAT-RESISTANT, RESIN COATED ELECTRIC WIRE CHARACTERIZED BY THREE RESIN COATINGS, THE OUTER OF WHICH IS LESS HIGHLY CROSS-LINKED THAN THE COATING NEXT ADJACENT THERETO

[75] Inventors: Miyuki Hagiwara, Maebashi; Masayoshi Sohara; Kunio Araki, both of Takasaki; Tsutomu Kagiya, Kyoto, all of Japan

[73] Assignees: Japan Atomic Energy Research Institute, Tokyo; Kishimoto Sangyo Co., Ltd., Osaka, both of Japan

[21] Appl. No.: 675,252

[22] Filed: Apr. 9, 1976

[30] Foreign Application Priority Data

| | | |
|---|---|---|
| Apr. 12, 1975 | Japan | 50-44445 |
| Oct. 13, 1975 | Japan | 50-123087 |

[51] Int. Cl.$^2$ ........................ B32B 15/02; B32B 15/08; H01B 3/44

[52] U.S. Cl. ................................ 428/380; 174/120 C; 174/120 SR; 428/383

[58] Field of Search ...................... 174/120 SR, 120 C; 428/380, 383

[56] References Cited

U.S. PATENT DOCUMENTS

| | | | |
|---|---|---|---|
| 2,198,977 | 4/1940 | Rost | 428/380 |
| 3,269,862 | 8/1966 | Lanza et al. | 428/383 |
| 3,546,014 | 12/1970 | Nicodemus | 428/383 |
| 3,607,387 | 9/1971 | Lanza | 428/383 |
| 3,657,008 | 4/1972 | Gleim | 428/383 |
| 3,769,085 | 10/1973 | Matsubara | 428/383 |
| 3,840,694 | 10/1974 | Luczak | 428/383 |
| 3,876,462 | 4/1975 | Carini et al. | 428/383 |
| 3,956,567 | 5/1976 | Krackeler et al. | 428/380 |

FOREIGN PATENT DOCUMENTS

| | | | |
|---|---|---|---|
| 1,415,974 | 8/1961 | Germany | 428/383 |

*Primary Examiner*—J.C. Cannon
*Attorney, Agent, or Firm*—Flynn & Frishauf

[57] ABSTRACT

Electric wire coated by a non-flammable resin, characterized in that the resin is composed of two layers, the degrees of crosslinking of which are different from each other, and the gel percent of the outer portion of the resin is lower than that of the inner portion of the resin is disclosed.

10 Claims, 4 Drawing Figures

HEAT-RESISTANT, RESIN COATED ELECTRIC WIRE CHARACTERIZED BY THREE RESIN COATINGS, THE OUTER OF WHICH IS LESS HIGHLY CROSS-LINKED THAN THE COATING NEXT ADJACENT THERETO

BACKGROUND OF THE INVENTION

This invention relates to a heat-resistant, self-extinguishing resin coated electric wire.

Since polyethylene, butyl rubber and ethylene-propylene rubber have excellent insulating properties, they are widely used as insulating material for electric wires. However, since they are combustible, they are likely to be flame-spread. Therefore, when they give rise to dielectric breakdown, this tends to become the origin of a fire. In order to overcome this disadvantage in the prior art, an attempt has been made to impart self-extinguishing property to a resin coated on electric wire. In general, such self-extinguishing property has been imparted to the resin by adding a self-extinguishing agent or a flame retardant to the resins.

However, when the self-extinguishing or flame retardant is added to the resin, the insulating property of the resin is lowered. For example, in order to impart self-extinguishing property to the resin without impairing the insulating property of the resin coated on the wire, a process which comprises coating a self-extinguishing polyvinyl chloride resin on electric wire having an insulating layer has been proposed. The reason why the electric wire having a self-extinguishing property polyvinyl chloride and a combustible, insulating resin thereon is burned only modestly is considered to be the following: When flames are struck against the wire, the polyvinyl chloride and the combustible, insulating resin are melted and heat-decomposed. The combustible resin generates a combustible gas through the heat-decomposition. When the gas passes through the outer non-flammable polyvinyl chloride, it reacts with a flame-retardant or a self-extinguishing agent present in the non-flammable polyvinyl chloride to form a self-extinguishing gas or the gas is mixed with a non-flammable gas or a self-extinguishing gas generated from the polyvinyl chloride, whereby combustibility of the gas generated from the combustible resin is lost. An electric cable as a whole can be made self-extinguishing by coating the self-extinguishing polyvinyl chloride as an outer layer on the electric wire.

In general, when polyvinyl chloride is used as a coating material for electric wire, the workability and flexibility of the chloride is necessary to be increased by adding a plasticizer to the resin. Such plasticizer includes plasticizers of phthalic acid type, such as dioctyl phthalate, of trimellitic acid type and of polyester type.

A copolymer of vinyl chloride and vinyl acetate, ethylene, propylene or an acrylic monomer can be used as a flexible polyvinyl chloride in place of adding a plasticizer to polyvinyl chloride.

Also, a flexible resin can be obtained by grafting vinyl chloride to an ethylene-vinyl acetate copolymer, ethylene-acrylic acid copolymer or ethylene-propylene copolymer. Such a vinyl chloride-grafted copolymer may be used as a self-extinguishing resin.

Though polyvinyl chloride is little burnt itself, self-extinguishing property of the resin is lowered by adding a plasticizer thereto. Some of the plasticized resin may be combustible. In order to increase the self-extinguishing property of polyvinyl chloride, an inorganic flame retardant, such as antimony trioxide or an organic flame retardant, such as an organic halogen compound is generally added to the plasticized polyvinyl chloride.

The term "a polyvinyl chloride series resin" or "vinyl chloride series polymer" means a polymer containing vinyl chloride units, such as a vinyl chloride-grafted polymer or a copolymer of vinyl chloride and an other monomer. In general, since the softening temperature of the polyvinyl chloride series resin is low, the resin is likely to be melted by heating the resin at a slightly elevated temperature. It has been known in the prior art that the polyvinyl chloride series resin is crosslinked in order to overcome the above disadvantages.

As mentioned above, though polyethylene, butyl rubber and ethylene-propylene rubber have excellent insulating properties, they are combustible. However, a mixture of the above polymer or chlorinated polyethylene, etc. with an inorganic flame retardant, such as antimony trioxide or an organic flame retardant, such as an organic halogenated compound, is self-extinguishing. These polymers have low softening temperatures. The softening temperature of the polymer is increased by introducing the crosslinking linkage thereinto.

We have found that when the degree of crosslinking of a polyvinyl chloride series resin is made high in order to promote the resistance to heat distortion of the resin, the self-extinguishing property of the resin is lowered, that is, the resin becomes likely to be flame-spread. We have carried out research on the relationship between the degree of crosslinking said resin and the time that combustion of the crosslinked resin continues. The results are shown in FIG. 1. The shorter the time that combustion of the crosslinked resin continues, the greater the nonflammability. The higher the gel percent of the resin, the greater the degree of cross-linking the resin.

We have also carried out research on the relationship between degree of cross-linking polyethylene and time of maintaining combustion of the crosslinked polyethylene. The results are shown in FIG. 3.

These FIGS. 1 and 3, show that the greater the degree of crosslinking the resin, the poorer the self-extinguishing property of the polymer. These FIGS. 1 and 3 also show that the nonflammability of the resin is enhanced by crosslinking the resin to a suitable extent. The degree of crosslinking the resin sufficient to obtain excellent resistance to heat distortion corresponds to gel percent of more than 70%. However, FIGS. 1 and 3 show that a resin having a gel percent of 70% is inferior to the non-crosslinked resin in respect of self-extinguishing property.

The reasons theorizing the relationship between the a degree of crosslinking a resin and the time that combustion of the crosslinked polymer continues are unclear at present. When the combustion gas generated from the combustible resin passes through the layer of the polyvinyl chloride, it is thought that penetration of the combustion gas into the polyvinyl chloride is suppressed according to the degree of crosslinking of the chloride. That is, penetrating of the combustion gas into the highly crosslinked polyvinyl chloride is prevented.

On the other hand, flames are struck against an electric wire on which an combustible, insulating resin and a polymer of vinyl chloride type are coated in the order of description, the two resins melt and decompose. However, when the polyvinyl chloride series resin is highly crosslinked, flowing of the resin can be avoided even when the resin melts.

Excessive crosslinking of the polyvinyl chloride series resin lowers the flexibility of the resin, whereby internal pressure derived from expansion of the combustible gas generated from the combustible resin is likely to give rise to cracking of the crosslinked resin. Therefore, the combustible gas which passes through a crack in the crosslinked polymer causes the combustion of the polymer-coated electric wire.

On the other hand, when flames are applied to the non-crosslinked resin coated on an electric cable, the non-crosslinked resin easily melts and flows, whereby the thickness of the nonflammable resin layer becomes non uniform. Particularly, the portion of the self-extinguishing resin against which flames are struck becomes thin in thickness. Therefore, the self-extinguishing resin layer having nonuniform thickness can not prevent the combustible gas generated from the combustion resin from leaking out. As a result, the non-crosslinked resin is substantially inferior to the resin crosslinked in respect of the self-extinguishing property.

On the other hand, since the resin crosslinked to a suitable extent has flexibility, the crack in the resin is not formed even in case of striking a flame against the resin.

SUMMARY OF THE INVENTION

We have carried out research on electric cable on the basis of the relationship between the self-extinguishing property of a resin and the degree of crosslinking of the resin, and as a result, this invention has been accomplished.

Therefore, one object of this invention is to provide an electric cable having excellent self-extinguishing properties and excellent resistance to heat distortion.

Another object of this invention is to provide an electric wire having a self-extinguishing resin consisting of two layers, the gel percents of which are different from each other.

DETAILED DESCRIPTION OF THE INVENTION

Figure 1:
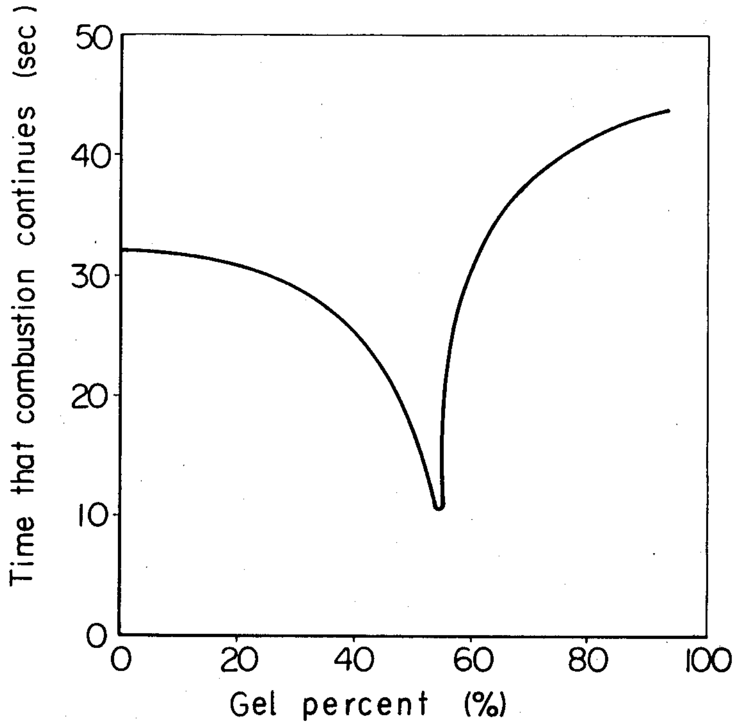
FIG. 1 shows the relationship between the combustion time (average) and the gel percent.

This invention relates to an electric cable coated by a combustible, insulating resin and a self-extinguishing resin, the outer layer being the self-extinguishing resin, characterized in that the self-extinguishing resin is composed of two layers, the degrees of crosslinking of which are different from each other, and gel percent of the outer portion of the nonflammable resin is lower than that of the inner portion of the resin. The outer portion of the self-extinguishing resin imparts self-extinguishing property to the electric wire, whereas the inner portion thereof imparts to the wire resistance to heat distortion. The outer portion of the nonflammable resin is crosslinked to such an extent that the resin flows only slightly. Therefore, the degree of crosslinking of the outer portion may be relatively low. Even when a flame is applied to the self-extinguishing property resin, the outer portion thereof flows only modestly, whereby the outer portion can prevent the combustible gas generated from the combustion resin from leaking out.

The inner portion of the resin is highly crosslinked so as to impart to the electric wire resistance to heat distortion.

Typical examples of the self-extinguishing resins include copolymers of vinyl chloride and an other monomer, such as vinyl acetate, ethylene, propylene or an acrylic monomer, and vinyl chloride-grafted ethylene-vinyl acetate copolymer, vinyl chloride-grafted ethylene-acrylic acid copolymer or vinyl chloride-grafted ethylene-propylene copolymer, and polyvinyl chloride containing a plasticizer, chlorinated polyethylene or ethylene-vinyl acetate copolymer containing an organic self-extinguishing agent, such as tribromo propane, dibromo propane, tetrabromo bisphenol, chloro paraffine, tris(dichloro propyl) phosphate or mixture thereof.

The gel percent of the outer portion of the self-extinguishing resin may be in the range of 20 – 65%, preferably 40 – 60%. The gel percent of the inner portion of the resin may be in the range of more than 65%, preferably more than 70%.

The ratio of the thickness of the inner portion of the nonflammable resin to that of the outer portion thereof may be in the range of 0.1 – 5, preferably 0.5 – 2.

Processes for crosslinking the nonflammable resin include a process for heating the resin containing an initiator, a process for irradiating the resin by means of an ionizing radiation or ultra violet. However, a process for crosslinking the resin by heating the resin containing the initiator and an organic halogen compound as a self-extinguishing agent cause decomposition of the resin and the halogen compound. A process for irradiating the resin by means of ultra violet crosslinks only the surface portion of the resin, because the penetrating power of the ultra violet is low.

On the other hand, a process for crosslinking the resin by irradiating it by means of an ionizing radiation is excellent, because the process does not need heating the resin and therefore, there is little decomposition of the resin and the halogen compound.

Even when the resin is crosslinked by means of an ionizing radiation, slight decomposition of the resin and of the halogen compound occurs. However, it is preferable that the amount of decomposition of the resin and the halogen compound be as small as possible. Therefore, a crosslinking agent may be added to the resin in order to lessen the total dose of irradiation. Typical examples of the crosslinking agent include a difunctional monomer, such as divinyl benzene, dimethylene dimethacrylate or diallyl phthalate, or a compound containing an acetylenic linkage, such as dipropargyl maleate, dipropargyl terephthalate or propynoic acid.

The following are three processes for preparing the nonflammable resin coat composed of two layers having different gel percents:

a. An electric wire having coated thereon an insulating resin is coated with the self-extinguishing resin, which is then irradiated with a high dose of radiation to form an inner layer having a high degree of crosslinking (or gel percent). The wire is further coated with the self-extinguishing resin and irradiated with a low dose of radiation to form an outer layer having a low degree of crosslinking (or gel percent).

b. A composite of the vinyl chloride series polymer wherein the content of a crosslinking accelerator in a deeper portion is greater than that in a portion near the surface is coated on the electric wire and irradiated with a dose of radiation. Because of the greater content of the accelerator, the deeper portion (inner layer) has a higher degree of crosslinking (gel percent) than compared with the surface area (outer layer). The ionizing radiation that can be used to irradiate the self-extinguishing vinyl chloride series polymer coat are such that they pass through said resin coat, for example, electron beams, gamma rays, etc. Appropriate rays can be determined by any one skilled in the art by taking into account the thickness of the resin to be irradiated. According to this process (b), radiation energy is provided evenly to the resin coat.

c. Radiation energy provided by some kinds of radiation is greater in a deeper portion than in the surface. The third process (c) takes advantage of this phenomenon. First, an electric wire is coated with an insulating material, then with the vinyl chloride series polymer wherein a crosslinking agent is uniformly distributed. Upon application of a radiation of the type that provides more energy in a deeper portion than in the surface, there are formed two layers in the self-extinguishing resin coat, one being an inner layer having a high degree of crosslinking (gel percent) and the other an outer or surface layer having a low degree of cross linking. The most important aspect of this process is that one application of radioactive rays is able to produce simultaneously an inner layer having a greater gel percent and an outer layer having a smaller gel percent.

Figure 2:
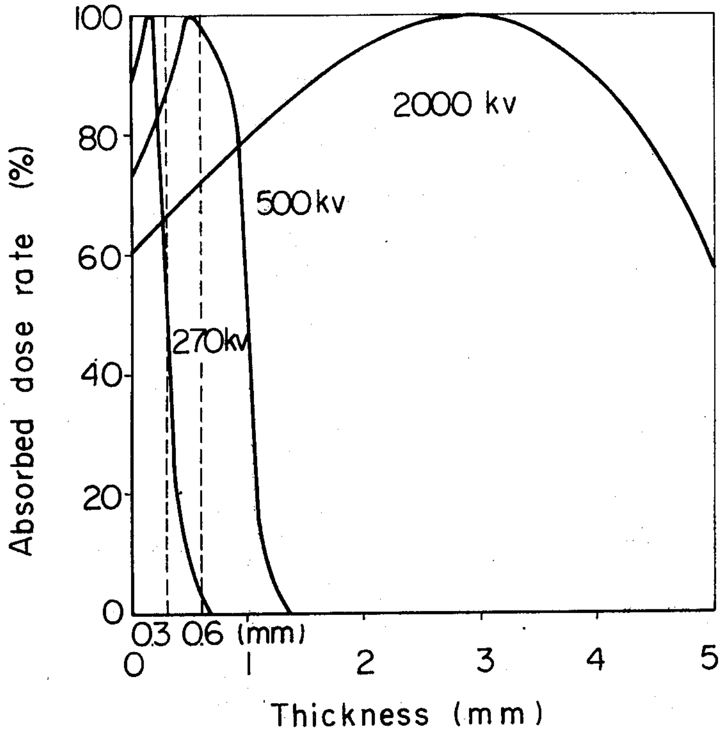
FIG. 2 shows the relationship between the thickness of the self-extinguishing polyvinyl chloride series resin coat (density: 1.4 g/c.c.) and the depth dose.
Figure 3:
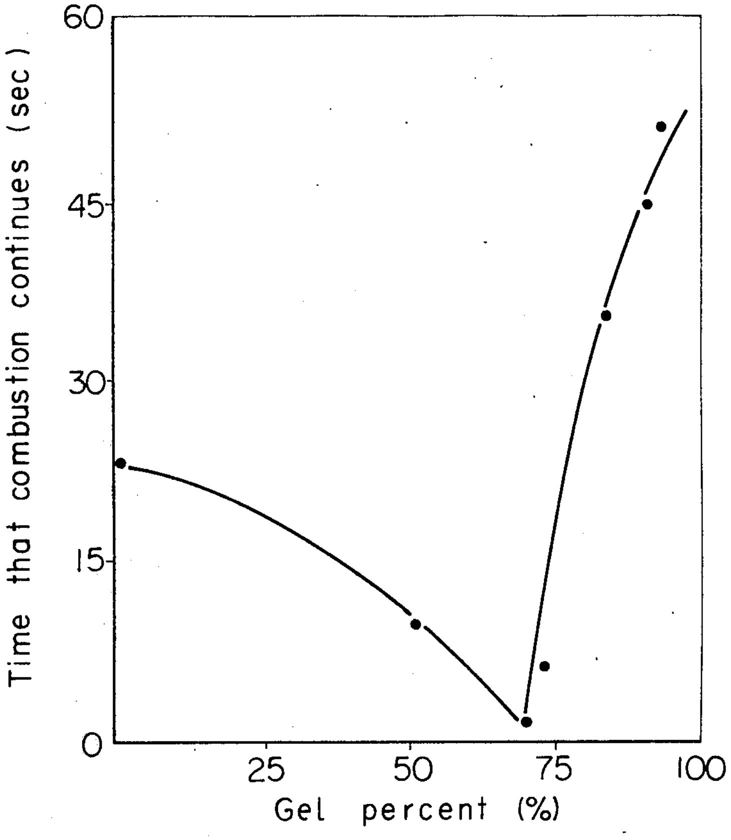
FIG. 3 shows the relationship between an average combustion time and the gel percent.
Figure 4:
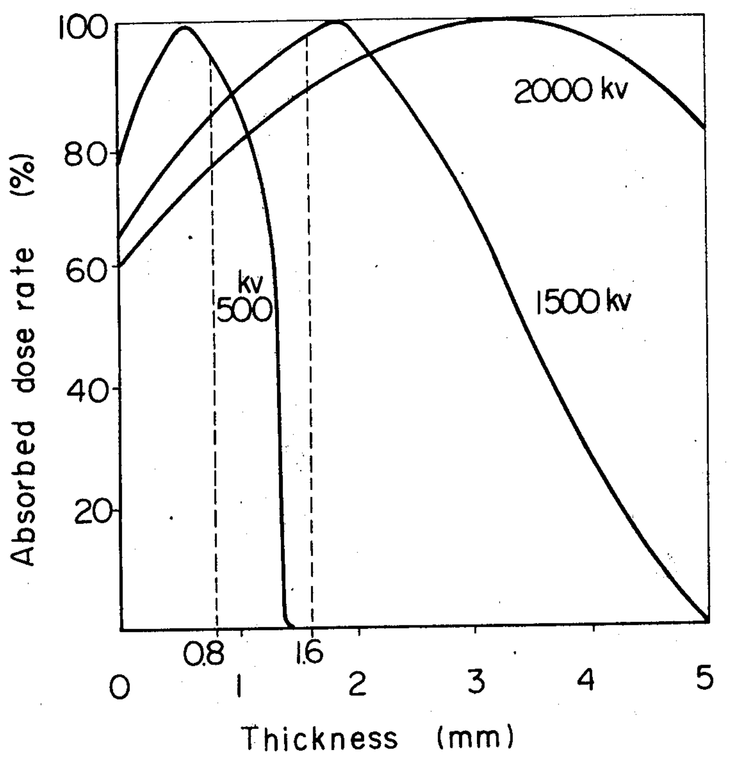
FIG. 4 shows the relationship between the thickness of a nonflammable polyethylene (having a density of 1.38 g/cc) and section-by-section radiation dose.

FIG. 2 shows the relationship between the energy provided by electron beams to a self-extinguishing vinyl chloride series polymer (density: 1.4 g/c.c.) and the depth of the polymer. It is apparent from this figure that the position where the depth dose is maximal varies according to the energy of electron beams applied. This fact bears an extremely great significance on the reduction of the present invention to practice. For example, in the case where a self-extinguishing vinyl chloride series polymer coating having a thickness of 0.6 mm is to be crosslinked, electron beams having an energy of 270 kv reach only an area near the surface of the coat, providing a highly crosslinked outer layer and an inner layer that has a low degree of crosslinking. This is entirely contrary to the requirement for the present invention that said degree be high in the inner layer and low in the outer layer. On the other hand, as will be understood from the figure, if electron beams applied have an energy of 500 kv, the energy provided in a deeper portion is about 30% more than that in the surface, thus producing conditions advantageous for accomplishing the object of the present invention. If electron beams have an energy of as high as 2,000 kv, variation in the degree of crosslinking according to the depth of the polymer coat is so small that the resulting coat substantially comprises only one layer.

Therefore, there is a close relationship between the thickness of a coat that is to be irradiated and a suitable radiation that provides more energy to a deeper portion of the coat than in the surface. In any event, such radiation can easily be selected by those skilled in the art.

By "radiation" or "radioactive rays" is meant what is generally called ionization radiation such as alpha rays, beta rays, gamma rays, accelerated electron beams, X-rays, neutron beams, and so forth. Irradiation may be carried out in air, but if the presence of oxygen may interfere with the reaction of crosslinking, it may be performed in an atomsphere of an inert gas such as nitrogen, carbonated gas and helium, or under degasified conditions using reduced pressure.

As stated before, the self-extinguishing electric wire of the present invention basically may comprise a conductive material coated, in sequence, with an insulating layer of a flammable resin and a self-extinguishing resin coat. The "flammable resins" that can be used in the present invention include those which have been widely employed as materials for coating electric wire because of their good dielectric property. Some examples of these resins are polyethylene, polypropylene, polyisobutylene, ethylene-propylene copolymer, polybutadiene, polyisoprene, butadiene-ethyrene copolymer, and isoprene-isobutylene copolymer, etc. When the nonflammable electric wire of the present invention is commercially employed, the above mentioned flammable resins may usually be rendered heat resistant by treatment of crosslinking.

In order to achieve the desired degree of crosslinking, the dose rate of an ionizing radiation may be in the range of 0.001 – $10^3$ Mrad, and the total dose of the radiation may be in the range of 0.1 – 50 Mrad.

It is preferred that the self-extinguishing resin contains antimony trioxide as an inorganic self-extinguishing agent.

It is not critical to coat the insulating layer on electric wire before coating with a nonflammable resin. For example, this invention may include an electric cable coated by a self-extinguishing resin having insulting property, characterized in that the resin is composed of two layers, the degrees of crosslinking of which are different from each other, and gel percent of the outer portion of the resin is lower than that of inner portion of the resin. The self-extinguishing resin having insulating property includes chlorinated polyethylene, ethylenevinyl chloride copolymer, polyethylene having an organic self-extinguishing agent or polyethylene-vinyl acetate copolymer having an organic self-extinguishing agent, or mixtures thereof. The proportion of the organic self-extinguishing agent may be in the range of 20% – 50% by weight on the basis of the polymer.

In order to make the self-extinguishing resin rigid, diallyl phthalate may be added to the resin.

The gel percent of the outer portion of the self-extinguishing resin having insulating property may be in the range of 20 – 85%, preferably 50 – 80%. The gel percent of the inner portion of the resin may be in the range of more than 85%, preferably 90%.

The self-extinguishing resin having insulating property may contain antimony trioxide.

The ratio of the thickness of the inner portion of the self-extinguishing resin having insulating property to that of the outer portion thereof may be in the range of 0.1 – 5.

In the following pages, embodiments and effects of this invention are explained by typical working examples. However, it should be understood that these examples are by no means of a limiting nature and that various modifications and alterations are possible without departing from the spirit and scope of this invention.

EXAMPLE 1

A compound of the self-extinguishing vinyl chloride series polymer was prepared that consisted of 100 parts by weight of an ethylene-vinyl acetate copolymer to which was grafted vinyl chloride, 5 parts by weight of antimony trioxide, 10 parts by weight of a chlorine-based organic flame retardant, 5 parts by weight of a stabilizer, and 1 part by weight of an age resistor or anti-oxidant. A mixture of dipropargyl malate and hexamethylene dimethacrylate in a ratio of 1:2 was used as a crosslinking accelerator. The compound and the accelerator were intimately blended with each other in a 75 liter Hensel mixer and fed to a 40 mm extruder to obtain pellets.

An electric wire consisting of a conductive copper piece having a diameter of 0.8 mm and having coated thereon a crosslinked polyethylene having an outer diameter of 2.1 mm was coated with said self-extinguishing vinyl chloride series polymer pellets in two layers. The thickness of each layer coated and the amount of the crosslinking agent added were as indicated in Table 1. The total thickness was adjusted to 0.6 mm with the inner layer ranging from 0.2 to 0.4 mm and the outer layer from 0.4 to 0.2 mm. The maximum amount of the crosslinking agent incorporated in the outer layer was 0.5% by weight, and the same agent was added to the inner layer in an amount ranging from 2.0 to 3.0% by weight, thereby obtaining an inner layer having a higher degree of crosslinking than an outer layer upon application of the same radioactive dose.

A flame retardancy test was conducted in accordance with UL Standard (Subject 758). That is to say, each of the electric wire test pieces was exposed to the flame (outer flame: 5 in, and inner flame: 3/2 in) of a gas burner having an inner diameter of $\frac{3}{8}$ in for 15 seconds wire. According to the UL Standard, the maximum combustion time is required not to exceed 60 seconds in any of the tests. But in the actual use of the electric wires, they are preferred to be self-extinguished within 40 seconds when taking into account errors in measurement and differences in the quality of the products. In this Example, the maximum combustion time was determined by using 10 test pieces for each of the wire samples. The average combustion time shown in Table 1 represents an average value of the maximum combustion time of each test piece.

The degree of crosslinking is indicated in the gel percent, which is the weight percentage of an insoluble portion obtained by immersing a sample of a given weight in boiling xylene for 5 hours.

The wire was then placed in a stainless steel container and irradiated with 5 Mrad of gamma rays from cobalt 60 in a nitrogen atmosphere.

As a control test, the same procedure was repeated except that the self-extinguishing resin coat comprised only one layer having a thickness of 0.6 mm and 0.5% of the crosslinking agent was incorporated in the coat.

Table 1 is the summarized results of the aforementioned test. It clearly shows that the flame retardancy of the electric wire was remarkably improved by applying a double-layer coat to it according to the present invention. The result of the control test is shown as a comparative example.

Table 1

| | Method of coating self-extinguishing vinyl chloride series polymer | | | | | | | self-extinguishing property | | |
|---|---|---|---|---|---|---|---|---|---|---|
| | double-layer coating | | | | | | | | | |
| | outer layer | | inner layer | | gel percent | | | maximum | average | |
| | crosslinking accelerator added (%) | thickness (mm) | crosslinking accelerator added (%) | thickness (mm) | outer layer (%) | inner layer (%) | average (%) | combustion time (sec) | combustion time (sec) | Ratings* |
| the present invention | 0.5 | 0.4 | 3.0 | 0.2 | 63.5 | 84.0 | 70.5 | 0.0 | 0.0 | P |
| | 0.5 | 0.4 | 2.0 | 0.2 | 63.2 | 79.2 | 68.6 | 0.0 | 0.0 | P |
| | 0 | 0.4 | 3.0 | 0.2 | 9.5 | 82.4 | 33.8 | 38 | 7.3 | P |
| | 0.5 | 0.2 | 3.0 | 0.4 | 62.5 | 82.1 | 75.4 | 32 | 27.2 | P |
| | mono-layer coating | | | | | | | | | |
| | crosslinking accelerator added (%) | | thickness (mm) | | | | (%) | (sec) | (sec) | |
| comparative example | 0 | | 0.6 | | — | | 9.5 | 43 | 31.9 | F |
| | 0.5 | | 0.6 | | — | | 63.5 | 58 | 39.8 | F |
| | 3.0 | | 0.6 | | — | | 82.8 | 71 | 41.7 | F |

*Ratings of "self-extinguishing" wire; rated "passed" if combustion continued for less than 40 sec, and "failed" if either maximum or average combustion time exceeded 40 sec.

at an interval of 15 seconds. But when combustion lasted for more than 15 seconds after removal of the gas burner flame from the test piece, it was not until the burning flame on the piece was gone that the next flame was applied to the wire again. It can be stated that the shorter the time that continued after removal of the burner's flame, the far better the flame retardancy of the

EXAMPLE 2

Wire samples were prepared according to the same procedure as that of Example 1. They were crosslinked with varied doses of radiation. The gel percent and flame obtained for each sample are indicated in Table 2.

Table 2

| | | Method of coating self-extinguishing vinyl chloride series polymer | | | | | | | self-extinguishing property | | |
|---|---|---|---|---|---|---|---|---|---|---|---|
| | | double-layer coating | | | | | | | | | |
| | | outer layer | | inner layer | | gel percent | | | maximum | average | |
| | dose of radiation (Mrad) | crosslinking accelerator added (%) | thickness (mm) | crosslinking accelerator added (%) | thickness (mm) | outer layer (%) | inner layer (%) | average (%) | combustion time (sec) | combustion time (sec) | Ratings* |
| this invention | 1.0 | 0.5 | 0.4 | 3.0 | 0.2 | 33.5 | 66.8 | 44.6 | 0.0 | 0.0 | P |
| | 2.5 | 0.5 | 0.4 | 3.0 | 0.2 | 59.1 | 77.8 | 65.4 | 0.0 | 0.0 | P |
| | 5.0 | 0.5 | 0.4 | 3.0 | 0.0 | 64.5 | 83.8 | 70.9 | 0.0 | 0.0 | P |
| control | 0 | 0.5 | 0.4 | 3.0 | 0.2 | 0.0 | 0.0 | 0.0 | 59 | 33.8 | F |
| | | mono-layer coating | | | | | | | | | |
| | (Mrad) | crosslinking accelerator added (%) | | thickness (mm) | | | | (%) | (sec) | (sec) | |

Table 2-continued

| | | | | | | | |
|---|---|---|---|---|---|---|---|
| 0 | 0.5 | 0.6 | — | 0.0 | 40 | 32.0 | P |
| 0.5 | 0.5 | 0.6 | — | 32.4 | 38 | 29.7 | P |
| 2.5 | 0.5 | 0.6 | — | 58.3 | 32 | 10.7 | P |
| 5.0 | 0.5 | 0.6 | — | 64.5 | 58 | 39.1 | F |

*Heat resistance was not sufficient because of the absence of a layer having a gel percent of more than 70%.

EXAMPLE 3

In a manner similar to that of Example 1, 3.0% by weight of the crosslinking agent was incorporated in the pellets of the self-extinguishing resin compound, and one layer of the resulting pellets having a thickness of 0.6 mm was applied to electric wire samples. They were then crosslinked by application of 5 Mrad of electron beams at different accelerating voltages. Average gel percents and flame retardancy obtained are indicated in Table 3.

Table 3

| | electron accelerating voltage (kv) | crosslinking accelerator added (%) | average gel percent (%) | self-extinguishing property: maximum combustion time (sec) | self-extinguishing property: average combustion time (sec) | Ratings |
|---|---|---|---|---|---|---|
| this invention | 500 | 3.0 | 80.5 | 34 | 28.7 | P |
| control | 270 | 3.0 | 37.9 | 67 | 44.4 | F |
| | 2,000 | 3.0 | 78.2 | 56 | 32.2 | F |
| | 60 Co- γ rays | 3.0 | 82.5 | 71 | 41.7 | F |

SUPPLEMENT (COMPARATIVE EXAMPLE)

The most important aspect of the present invention is that the inner layer of the self-extinguishing resin coat has a higher gel percent than the outer layer. Table 4 shows the gel percents and flame retardancy of the self-extinguishing resin coat wherein the gel percent of the inner layer was lower than that of the outer layer. The dose of radiation to effect crosslinking was 5 Mrad of Co-gamma rays.

Table 4

| | outer layer: crosslinking accelerator added (%) | outer layer: thickness (mm) | inner layer: crosslinking accelerater added (%) | inner layer: thickness (mm) | gel percent: outer layer | gel percent: inner layer | gel percent: average | self-extinguishing property: maximum combustion time (sec) | self-extinguishing property: average combustion time (sec) | Ratings |
|---|---|---|---|---|---|---|---|---|---|---|
| control | 3.0 | 0.4 | 0.5 | 0.2 | 81.5 | 61,8 | 73.0 | more than 120 | more than 42 | F |
| | 2.0 | 0.4 | 0.5 | 0.2 | 78.2 | 61.5 | 71.5 | 43 | 26.6 | F |
| | 3.0 | 0.4 | 0.0 | 0.2 | 83.0 | 10.2 | 59.5 | 41 | 32.4 | F |
| this invention | 0.5 | 0.4 | 2.0 | 0.2 | 63.2 | 79.2 | 68.6 | 0.0 | 0.0 | P |

This table shows that the higher content of the gel in the outer layer of the coat results in a low flame retardancy.

EXAMPLE 4

Polyethylene, chlorinated polyethylene, organic self-extinguishing agent, inorganic self-extinguishing agent and other agents were blended together at the following ratio (basic blending ratio) to obtain a self-extinguishing polyethylene resin.

| Basic blending ratio | | Parts by weight | |
|---|---|---|---|
| polyethylene (low-density-polyethylene) | | 20 | parts |
| chlorinated polyethylene (35% by weight of chlorine content) | | 80 | parts |
| inorganic self-extinguishing agent (antimony trioxide) | | 40 | parts |
| stabilizer | (tribase) | 5 | parts |
| | (barium stearate) | 2 | parts |
| | (lead stearate) | 1 | part |
| age resistor | | 0.5 | parts |
| extender (calcium carbonate) | | 10 | parts |
| diallyl phthalate | | 5 | parts |
| organic self-extinguishing agent (chloroparaffin) | | 5 | parts |

In the next place, cross-linking accelerators, dipropargylmalate (DPM) and hexamethylene diacrylate (HMA) were added to said basic blend in the ratio as indicated in Table 1, followed by blending them together, to obtain a pellet-shaped compound. An electric conductive copper piece having a diameter of 0.8 mm was coated with a self-extinguishing compound in two layers in the blending ratio as indicated in Table 1. The coated thickness of the outer layer and the inner layer were 0.8 mm, respectively, with a total thickness of 1.6 mm. No cross-linking accelerator was added to the outer layer, while 2.0 – 3.0% by weight of the crosslinking accelerator was added to the inner layer, in an attempt to make the crosslinkage of the inner layer become greater than that of the outer layer when the same radioactive dose was applied to them. Table 5. The blending ratio of the crosslinking accelerators Table 5

| Sample No. | | DPM (wt.%) | HMA (wt.%) |
|---|---|---|---|
| I | Inner layer 0.8 mm | 1.0 | 2.0 |
| | Outer layer 0.8 mm | 0.0 | 0.0 |
| II | Inner layer 0.8 mm | 2.0 | 0.0 |
| | Outer layer 0.8 mm | 0.0 | 0.0 |
| III | Single layer coating 1.6 mm | 1.0 | 2.0 |

Incidentally, the self-extinguishing property test was conducted in accordance with UL Standrad (Subject 758) FR-1. That is to say, 5 inches of the outer flame, each having an inner diameter of ⅜ inches and 3/2 inches of the inner flame from a gas burner were applied to an electric wire sample for 15 seconds at an interval of 15 seconds, respectively. But when burning lasted for more than 15 seconds after the application of the gas burner flame was stopped, it was not until the burning flame was gone that the next flame was applied to the wire again. This way, each burning time was measured after the flame was removed from the wire. It is believed that the shorter the burning time, the far better the self-extinguishing property. The UL Standard indicated that the maximum burning time should not exceed 60 seconds in any of the tests. But in practice, the self-extinguishment of the electric cable was preferred when taking into consideration of a measuring error and differences in the samples (products) to be used. In this Example, 10 samples were used for each of the electric cables. The average burning time shown in the Table represents an average value of the maximum burning time of the respective samples. The cross-linkage is indicated in the gel ratio.

In other words, this value represents by weight percentage of an insoluble portion, after a predetermined dose of test piece was immersed in a boiling xylene for 20 hours. Thereafter, the cable was placed into a stainless steel container, to which 5 - 20 M of gamma ray from cobalt 60 was applied in a nitrogen atmosphere. In the next place, the aforementioned operation was repeated except that a control test was made, wherein the content (amount) of the cross-linking accelerator in the coating material was made to be 3.0% by weight, and the coating was made only on the single layer to a thickness of 1.6 mm.

Table 7 is the summarized result of the aforementioned test. From the Table, it will be understood that the fire retardancy is remarkably improved thanks to the double-layer coating according to the present invention. Incidentally, the result of the control test is shown as a comparative example. Table 6 deals with the fire retardancy of the fire retardant (electric) wire. The ratings were set forth on the following basis.

| Burning time (maximum burning time) | |
|---|---|
| less than 40 seconds | passed (P) |
| more than 40 seconds | failed (F) |

Table 6

| | Coating sample No. | Radiation dose (amount) (M rad) | Gel ratio (%) Outer layer | Inner layer | Average | self-extinguishing property Maximum burning time | Average burning time | Ratings |
|---|---|---|---|---|---|---|---|---|
| A process according to the present invention | I | 5.0 | 68.8 | 81.5 | 75.2 | 7 | 3.2 | P* |
| | | 10.0 | 77.2 | 92.8 | 85.0 | 19 | 10.6 | P |
| | | 20.0 | 86.1 | 95.5 | 90.8 | 21 | 20.2 | P |
| | II | 5.0 | 72.2 | 88.5 | 80.2 | 5 | 4.2 | P |
| | | 10.0 | 82.5 | 95.5 | 89.5 | 15 | 9.2 | P |
| | | 20.0 | 88.5 | 97.2 | 93.0 | 20 | 18.5 | P |
| Control | III | 5.0 | — | — | 83.2 | 38 | 34.8 | P* |
| | | 10.0 | — | — | 93.2 | 92 | 65.6 | F |
| | | 20.0 | — | — | 95.8 | 120< | 120< | F |

*The Table above indicates that self-extinguishing property is rated "Passed", whereas the comparative example is not believed to possess sufficient fire-proof property, since the gel ratio does not have a layer exceeding 88%.

EXAMPLE 5

A self-extinguishing property polyethylene pellet added by 3.0% by weight of the cross-linking accelerator (refer to Sample No. III, single layer), in accordance with the same method as in Example 4, was coated only in one layer on a conductive copper piece at a thickness of 16 mm to make a self-extinguishing property electric wire having an outer diameter of 4.0 mm φ, to which was applied an electronic ray of accelerated voltage at 1,500 KV for 10 - 20 Mrad to carry out cross-linkage. The average gel ratio and the self-extinguishing property measuring results thus obtained are shown in Table 7. Further, as a comparative example, the results obtained by carrying out the cross-linkage by applying to the conductive copper piece 500 KV (only the surface layer cross-linkage), 2,000 KV and $^{60}$Co-gamma ray (Uniform cross-linkage) are also given as a reference.

Table 7

| | Electronic ray of accelerated voltage (KV) | Radiation dose (amount) (M rad) | Average gel ratio (%) | self-extinguishing property Maximum burning time (sec) | Average burning time (sec) | Ratings |
|---|---|---|---|---|---|---|
| A process according to the present invention | 1500 KV | 10.0 | 89.3 | 34 | 30.2 | P |
| | | 20.0 | 91.0 | 38 | 34.3 | P |
| A comparative example | 500 KV | 10.0 | 48.5 | 59 | 48.2 | F |
| | | 20.0 | 52.3 | 65 | 55.8 | F |
| | 2000 KV | 10.0 | 88.5 | 53 | 40.5 | F |
| | | 20.0 | 91.2 | 62 | 52.0 | F |
| | $^{60}$Co-gamma ray | 10.0 | 90.2 | 92 | 65.6 | F |
| | | 20.0 | 93.0 | 120< | 120< | F |

What we claim is:

1. Electric wire coated by a combustible, insulating resin and a self-extinguishing resin, the outer layer being the self-extinguishing resin, characterized in that the self-extinguishing resin is composed of two layers, the degree of crosslinking of which are different from each other, and gel percent of outer portion of the self-extinguishing resin is lower than that of inner portion of the self-extinguishing resin.

2. The electric wire defined in claim 1 wherein the self-extinguishing resin is selected from the group consisting of copolymer of vinyl chloride and a monomer selected from the group consisting of vinyl acetate, ethylene, propylene or an acrylic monomer; vinyl chloride-grafted ethylene-vinyl acetate copolymer; vinyl chloride-grafted ethylene-acrylic acid copolymer; vinyl chloride-grafted ethylene-propylene copolymer; polyvinyl containing a plasticizer; chlorinated polyethylene; polyethylene-vinyl acetate copolymer containing an organic self-extinguishing agent; or mixtures thereof.

3. The electric wire defined in claim 1 wherein the ratio of the thickness of the inner portion of the self-extinguishing resin to that of the outer portion thereof is in the range of 0.1 – 5.

4. Electric wire coated by a self-extinguishing resin having insulating property, characterized in that the self-extinguishing resin is composed of two layers, the degrees of crosslinking of which are different from each other, and gel percent of the outer portion of the resin is lower than that of the inner portion of the resin.

5. The electric wire defined in claim 4 wherein the self-extinguishing resin having insulating property is selected from the group consisting of a chlorinated polyethylene, ethylene-vinyl chloride copolymer, polyethylene having an organic self-extinguishing agent, polyethylenevinyl acetate copolymer having an organic self-extinguishing agent, or mixtures thereof.

6. The electric wire defined in claim 4 wherein the ratio of the thickness of the inner portion of the resin to that of the outer portion thereof is in the range of 0.1 – 5.

7. Electric wire defined in claim 1 wherein the gel percent of the outer portion of the self-extinguishing resin is from 20 to 65 percent, and the gel percent of the inner portion thereof is more than 65 percent.

8. Electric wire defined in claim 1 wherein the gel percent of the outer portion of the self-extinguishing resin is from 40 to 60 percent, and the gel percent of the inner portion thereof is more than 70%.

9. Electric wire defined in claim 4 wherein the gel percent of the outer portion of the self-extinguishing resin is from 20 to 85 percent, and the gel percent of the inner portion thereof is more than 85 percent.

10. Electric wire defined in claim 4 wherein the gel percent of the outer portion of the self-extinguishing resin is from 50 to 80 percent, and the gel percent of the inner portion thereof is more than 90 percent.

* * * * *